Nov. 12, 1946.  R. J. SHARP  2,411,006
STEAM KETTLE
Filed Jan. 18, 1945  2 Sheets-Sheet 1

INVENTOR.
RENWICK J. SHARP
BY Victor J. Evans & Co.
ATTORNEYS

Nov. 12, 1946. R. J. SHARP 2,411,006
STEAM KETTLE
Filed Jan. 18, 1945 2 Sheets-Sheet 2
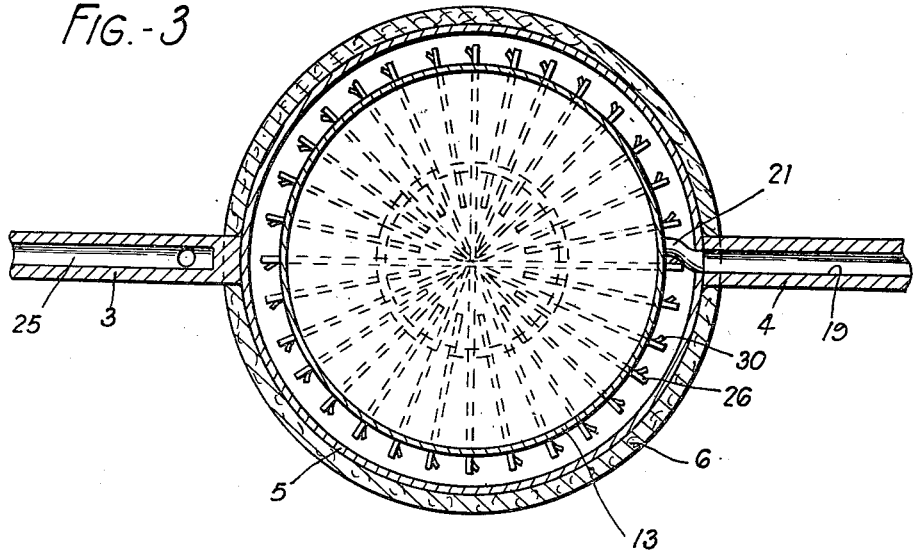
FIG.-3
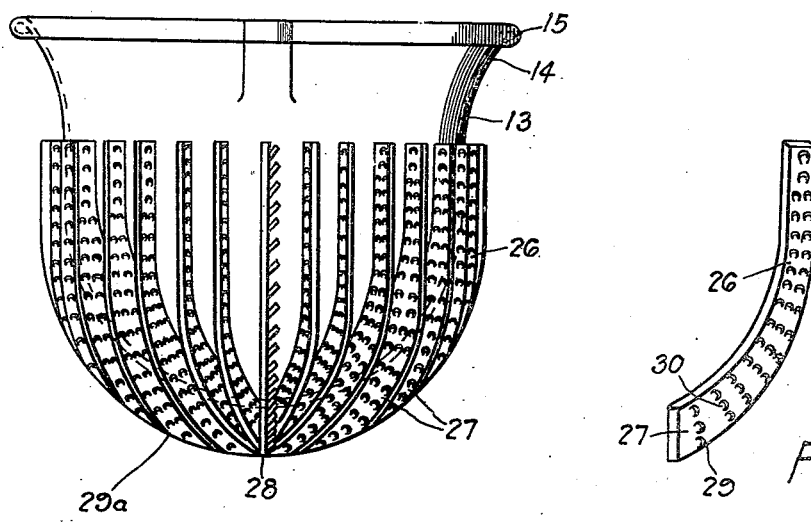
FIG.-4
FIG.-5
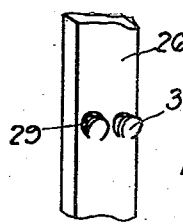
FIG.-6
INVENTOR.
RENWICK J. SHARP
BY Victor J. Evans & Co.
ATTORNEYS Patented Nov. 12, 1946

2,411,006

UNITED STATES PATENT OFFICE 2,411,006

STEAM KETTLE

Renwick J. Sharp, Guatemala, Guatemala

Application January 18, 1945, Serial No. 573,429

1 Claim. (Cl. 126—378)

My present invention, in its broad aspect, has to do with improvements in steam kettles, and more particularly, it is my purpose to greatly reinforce steam kettle construction and greatly increase heat transference to the end that fuel, time and labor are saved, and a more evenly distributed and efficient heating arrangement obtained.

In steam kettles heretofore known, it has been the practice to introduce steam under pressure between the inner and outer sheets of a steam kettle and tap off the condensate: the inner and outer shells not being insulated and there being no ribs, vanes, reinforcements or the like between the shells. Such kettles have a considerable heat loss and have been known to explode with injury to attendants.

My steam kettle, as distinguished from those of the prior art, has reinforcing ribs on the outside of the inner shell and extending into the space between the shells; these ribs are punched to form openings and small vanes or outstanding parts and the ribs not only greatly reinforce the structure of the kettle, but increase efficiency and heat transference and the openings permit ready passage of steam and condensate and the vanes facilitate heat transference and the like. My outer shell is insulated to prevent heat loss and the steam kettle greatly improved.

Other and equally important objects and advantages of my invention will be apparent from the following description and drawings, but changes may be made in the form, size, shape, construction and arrangement of parts without departing from by broad inventive concept, or the scope of the appended claim.

In the drawings wherein I have illustrated a preferred form of my invention:

Figure 3 is a longitudinal section on the line 3—3 of Figure 1.

Figure 4 is a side elevation of my inner shell or kettle, per se, showing the ribs.

Figure 5 is a perspective view of one of the perforated ribs.

Figure 6 is a detail of the perforations and vanes or outstanding parts formed thereby.

In the drawings wherein like characters of reference are used to designate like or similar parts throughout the several views:

Figure 1:
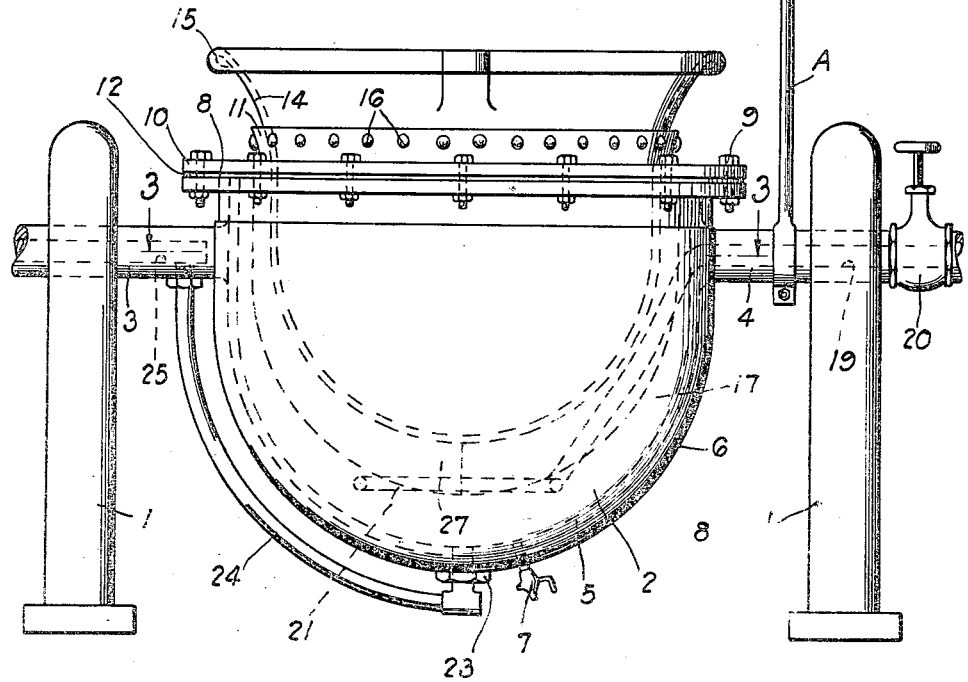
Figure 1 is a side elevation.
Figure 2:
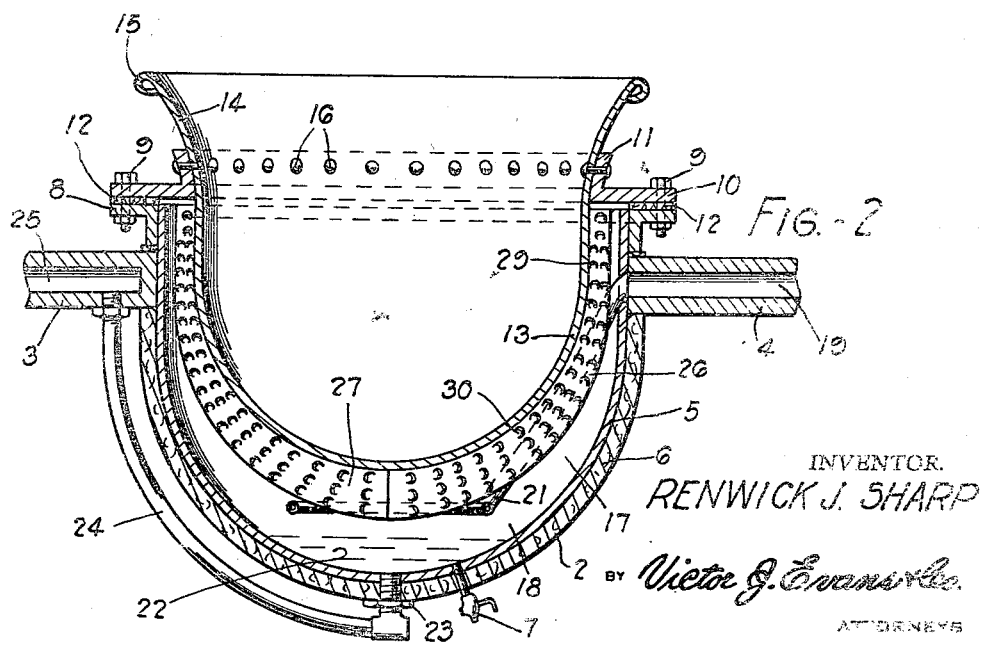
Figure 2 is a vertical section.

The numeral 1 designates the spaced vertical standards between which my steam kettle 2 is pivotally mounted on opposed trunnions 3 and 4. A hand lever A is provided in one trunnion to tilt the kettle. The trunnions are fixed to the substantially semi-cylindrical outer shell or casing 5, and the outer shell or casing is covered over its whole surface by a layer of insulation 6 and has a drain cock 7 in its bottom part. The top edge of the outer shell or casing is outwardly and annularly flanged as at 8 and bolted as at 9 to said flange is an inner shell or kettle supporting ring 10 having an upwardly and slightly outwardly curved annular flange 11. Suitable packing or gasket means 12 are provided between the flange and ring to provide a sealed joint.

The inner shell or kettle, per se 13, is substantially semi-cylindrical and has an outwardly curved or flared upper edge 14 with a terminal bead 15. The inner shell or kettle is riveted or otherwise secured as at 16 to the flange 11 of supporting ring 10 to be spaced from the outer shell or casing to form a steam chamber 17 gradually increasing in width toward the bottom as at 18. The material to be cooked, such as candy or the like, is placed in the inner shell or kettle per se.

Trunnion 4 is longitudinally bored as at 19 to form a steam conduit leading into the chamber 17 and a valve 20 is provided to control the delivery of steam thereto. A pipe 21 may lead from the conduit to and around the bottom of the inner shell or kettle. Condensation 22 is collected in the bottom of chamber 17 and a tap 23 to a condensation removal pipe 24 is provided, which condensation removal pipe is curved to extend upwardly about the outer shell and connect with a condensation outlet bore 25 in trunnion 3.

To reinforce my inner shell or kettle, per se 13, I provide spaced vertically extending reinforcing ribs 26 which gradually increase in width as at 27 toward a common radiating point 28 at the bottom of the shell. These ribs are curved as at 29a to fit the contour of the kettle and gradually converge to the radiating point 28 and may be formed integrally with the wall of the shell. They extend upwardly to about the supporting ring 10. The ribs greatly reinforce the kettle and greatly increase heat transference. Each rib has as many openings 29 punched therein as is practical; such openings being preferably punched from one direction and in a manner to leave angularly laterally and upwardly extending fins or parts 30—see Figure 6—which increase heat transference and guide the steam introduced into the kettle and insure full and prompt circulation.

From the foregoing, it is believed that the operation and advantages of my invention will be apparent, but it is again emphasized that interpretation of its scope should only be conclusive when made in the light of the subjoined claim.

I claim:

The combination with a steam kettle having inner and outer spaced shells forming a steam chamber and a steam inlet and a condensation outlet; of a plurality of reinforcing and heat transferring ribs provided in closely spaced relationship extending upwardly over the outer surface of the inner shell from a common radiating point at its bottom and in vertical planes extending radially of the inner shell said ribs extending into the steam chamber and having a plurality of vanes punched laterally from said ribs and thereby forming a plurality of closely spaced openings therein and said vanes extending angularly and upwardly at about 45 degrees from the body of ribs, and insulation about the outer shell.

RENWICK J. SHARP.